United States Patent Office 3,083,173
Patented Mar. 26, 1963

3,083,173
STRIPPING AND CREAMING BUTYL RUBBER LATICES WITHIN A SPECIFIC pH RANGE
Edgar Warren Seefield, Fred J. Buchmann, and Hugh Erwin Stanley, Baton Rouge, La., assignors to Esso Research and Engineering Company, a corporation of Delaware
No Drawing. Filed July 13, 1960, Ser. No. 42,497
6 Claims. (Cl. 260—29.7)

This invention relates to the sequence of steps necessary in preparing finished butyl rubber latices from the crude emulsions of the hydrocarbon solution of butyl rubber in water and more particularly relates to methods for reducing foaming during stripping to remove solvent from the crude latex and to increase the creaming rates of the solvent-free latex.

Butyl rubber latices are prepared by dissolving the butyl rubber in a suitable hydrocarbon solvent and emulsifying the resulting solution in water in the presence of an emulsifier and a stabilizer to form a raw latex. The solvent is removed from the raw latex by vaporization or by stripping with wet nitrogen or other inert gas and then set to cream with or without the addition of a hydrophilic colloidal creaming agent. This will cause the dispersion on standing to separate into a polymer-rich fraction and a serum or polymer-poor fraction, which fractions may be separated from each other by simple mechanical means, such as decantation, drawing off, and the like.

By the present invention, there is obtained a decrease in the amount of foaming attending solvent stripping. There is also obtained an increase in the rate of creaming while the stability of the latex is maintained at maximum levels during both stripping and creaming. In accordance with the present invention the pH of butyl rubber dispersion is maintained between 9.5 and 10 during the solvent stripping step and thereafter raised to above 11 during creaming. The adjustment of the pH of the raw latex to 9.5 to 10 during solvent stripping is necessary to keep foaming at a minimum and to prevent coagulation of the latex. At lower pH the stability is reduced, while at higher pH foaming is considerably increased. On the other hand, the desired pH of the latex during the creaming step must be increased above 11 in order to facilitate creaming.

The butyl rubber latices used in the practice of this invention are dispersions of vulcanizable elastic copolymers if isoolefins and a small amount of a diolefin. The copolymers, useful in the present invention, contain a major proportion, preferably at least 70 weight percent of isoolefins, and a minor proportion, preferably not more than about 30%, of diolefins. Copolymers of this general type, especially where the copolymer contains about 85–99.5% of a $C_4$–$C_7$ isoolefin, such as isobutylene, with about 15–0.5% of a diolefin of 4–14 carbon atoms, are commonly referred to in patents and literature as "butyl rubber." See for example the textbook "Synthetic Rubber" by G. S. Whitby (1954 edition by John Wiley & Sons, Inc.), pages 608–609, etc. The preparation of butyl-type rubbers is amply described in the literature. In general, it consists of the reaction product of a major proportion of $C_4$–$C_7$ isoolefin with a minor proportion of a $C_4$–$C_{10}$ conjugated diolefin at low temperatures with a dissolved $AlCl_3$ catalyst. The reaction product of isobutylene and isoprene is preferred.

The rubber is prepared as a crumb, and the first step in preparing a latex is to dissolve the crumb in a hydrocarbon solvent, such as hexane, to form a cement having a concentration of 10 to 30 weight percent rubber solids. Other suitable hydrocarbons may be used as solvents, such as heptane, octane, isooctane, the nonanes, the decanes, naphtha fractions, benzene, toluene, mineral spirits, Solvesso 100 (a highly aromatic hydrocarbon fraction boiling 157°–177° C.), Solvesso 150 (similar to Solvesso 100 boiling about 190°–210° C.), cyclohexane, and cyclohexene.

Latices are suitably prepared from this cement by emulsifying it with 55 to 170 parts by weight of water per 100 parts of cement in the presence of a fatty acid soap, such as the monovalent cationic salts of oleic acid, palmitic acid, stearic acid, myristic acid, linoleic acid, linolenic acid, dihydroabietic acid, di- and tetra-hydroabietic acid or their mixtures obtained by the hydrolysis of naturally occurring fats and oils (e.g., tallow acids and tall oil acids).

In preparing the emulsion, the components may be blended in any type of equipment which gives violent agitation, such as a colloid mill, a Dispersator, a Waring Blendor and the like. A particularly suitable type of equipment has been found to be a sonic mixer known as the Rapisonic Homogenizer. This consists of a gear pump which forces the materials through an orifice and impinges the stream on a knife-edge vibrating blade, incased in a resonating bell. The energy of vibration is obtained from the force of the stream striking the blade.

Regardless of the technique used in preparing the emulsion, the pH of the raw latex is adjusted to 9.5 to 10 by any appropriate means. The solvent is then removed by distilling, stripping or flashing. This may be done under vacuulm, if desired. When done in this manner, there is very little foaming and substantially no coagulation of the rubber.

After stripping off the solvent, the dispersion of polymer in water is drawn off and the pH increased to above 11. It is then allowed to cream with or without the addition of a creaming agent. The separation of an upper cream layer proceeds at a rapid rate resulting in the formation of a high solids content latex layer having a concentration in the range of 60–70% solids by weight. Further creaming fails to take place or occurs only slowly; accordingly, the cream is removed when the cream layer reaches a concentration of 60–70 weight percent, preferably 60–65 weight percent, and is stored with only a minimum of agitation required to prevent further creaming on long standing. The serum layer substantially free of rubber solids but containing appreciable amounts of emulsifier may be recycled to the emulsification steps.

The following examples will further illustrate how this invention may be carried out but it is not intended that the invention be restricted in any way thereto.

*Example 1*

A butyl rubber solution in hexane containing 22–23 weight percent of rubber solids was emulsified with water in accordance with the following recipe:

| | |
|---|---|
| Butyl rubber solution_____parts by vol__ | 70 |
| Water_____do____ | 30 |
| Emulsifier [1] (per 100 parts rubber solids) parts by wt__ | 5 |
| Na naphthalene sulfonic acid stabilizer (per 100 parts rubber solids)_____parts by wt__ | 0.3 |

[1] A mixture of the potassium salts of fatty acids in the following proportions:

| | Wt. percent |
|---|---|
| Oleic acid | 80–86 |
| Linoleic acid | 10–6 |
| Stearic acid | 5–1 |
| Palmitic acid | 4–5 |
| Myristic acid | 0–2 |
| Linolenic acid | 1–0 |

The resulting raw latex was stripped in a 3 T/D solids pilot plant stripper in two portions; one at a pH of 12 and the other at a pH of 9.8. The first run at pH 12 foamed so badly that the run had to be discarded despite the fact that 0.95 part by weight (per 100 parts of rubber) of a silicone antifoaming agent were added. The second run was successful, much less antifoamant was required (0.35 part by weight per 100 parts of rubber), and smoother operations were obtained.

*Example 2*

A raw latex was prepared as in Example 1 and stripped to 29.5% solids in a 150 gallon pilot plant stripper at a pH of 9.5 to remove the hexane. Little foaming was encountered, and the operation was in general the same as the second run of Example 1. The hexane-free latex was divided into two portions; one portion was creamed without changing the pH, while the other had its pH adjusted to about 11–12 by the addition of KOH and allowed to cream. The following data were obtained:

| Run | pH | Settling time, Hrs. | Wt. Percent Total solids | |
|---|---|---|---|---|
| | | | Upper Layer | Lower Layer |
| 1 | 9–9.5 | Very slow creaming | | |
| 2 | 11–12 | 2 | 39 | 8 |
| | | 5 | 43 | 6.5 |

In Run No. 1, the latex creamed very slowly, there being no visible separation into layers after 5 hours. In Run No. 2, the latex creamed into two distinct layers in about 2 hours.

*Example 3*

A hexane-free latex (24.0% solids) prepared in a manner similar to that of Example 1 was creamed at varying pH values by settling in a 100 ml. graduated cylinder. The following data were obtained:

| Run No. | pH | Creaming Time, Hrs. | Volume Percent Layers | | Wt. Percent Solids | |
|---|---|---|---|---|---|---|
| | | | Upper | Lower | Upper Layer | Lower Layer |
| 1 | 9.9 | 13 | 61 | 39 | 38 | |
| | | 38 | 56 | 44 | 44.3 | 4.7 |
| 2 | 10.5 | 13 | 61 | 39 | 39 | |
| | | 38 | 56 | 44 | 44.2 | 3.7 |
| 3 | 11.1 | 13 | 57 | 43 | 42 | |
| | | 38 | 52 | 48 | 47 | 3.7 |
| 4 | 11.6 | 13 | 49 | 51 | 48 | |
| | | 38 | 47 | 53 | 50.3 | 3.9 |
| 5 | 12.4 | 13 | 46 | 54 | 48 | |
| | | 38 | 42 | 58 | 51.2 | 5.7 |

*Example 4*

A hexane-free latex (54.6 weight percent solids) prepared in a manner similar to that of Example 1 was creamed at a pH of 10.3 for varying periods of time. The upper 75 vol. percent was removed as high solids cream, the lower 25 vol. percent was segregated and could be further creamed to make recovery of polymer essentially complete.

| Run No. | Creaming Time, Hrs. | Weight percent solids in Cream | Weight percent solids in Lower Phase |
|---|---|---|---|
| 1 | 16 | 60.6 | 40.6 |
| 2 | 42 | 61.1 | 37.0 |
| 3 | 88 | 61.4 | 34.8 |
| 4 | 286 | 62.4 | 27.6 |

The nature of the present invention having been thus fully set forth and specific examples of the same given, what is claimed as new and useful and desired to be secured by Letters Patent is:

1. Process for preparing a high solids latex of a copolymer of a major proportion of a $C_4$ to $C_7$ isoolefin with a minor proportion of a $C_4$ to $C_{10}$ conjugated diolefin which comprises emulsifying a 10 to 30 weight percent solution of said copolymer in 55 to 170 parts by weight of water per 100 parts by weight of said solution in the presence of a fatty acid soap emulsifier; adjusting the pH of the resulting emulsion to 9.5–10; distilling the emulsion to remove the solvent; again adjusting the pH of the solvent-free latex to above 11; creaming the latex at this pH until the cream attains a copolymer content of 60–70 weight percent; immediately effecting a separation between the latex cream and serum; and storing the cream under mild agitation to prevent further creaming.

2. Process according to claim 1 in which the copolymer is a copolymer of isobutylene and a minor amount of isoprene and the hydrocarbon solvent is hexane.

3. Process for preparing a high solids latex of a copolymer of a major proportion of a $C_4$ to $C_7$ isoolefin with a minor proportion of a $C_4$ to $C_{10}$ conjugated diolefin which comprises emulsifying a 10 to 30 weight percent solution of said copolymer in 55 to 170 parts by weight of water per 100 parts by weight of said solution in the presence of a fatty acid soap emulsifier; adjusting the pH of the resulting emulsion to 9.5–10; distilling the emulsion to remove the solvent; again adjusting the pH of the solvent-free latex to above 11; creaming the latex at this pH and effecting a separation between the latex cream and the serum.

4. Process according to claim 3 in which the copolymer is a copolymer of isobutylene and a minor amount of isoprene and the hydrocarbon solvent is hexane.

5. A process for preparing a high solids latex of a copolymer of a major proportion of a $C_4$ to $C_7$ isoolefin with a minor proportion of a $C_4$ to $C_{10}$ conjugated diolefin from a crude emulsion of a hydrocarbon solution of said copolymer in water which comprises distilling the crude emulsion at a pH of 9.5–10 to remove the solvent with minimum foaming, creaming the solvent-free latex at a pH above 11; and effecting a separation between the latex cream and the serum.

6. Process according to claim 5 in which the copolymer is a copolymer of isobutylene and a minor amount of isoprene and the hydrocarbon solvent is hexane.

References Cited in the file of this patent

UNITED STATES PATENTS

| | | |
|---|---|---|
| 2,476,430 | Robbins | July 19, 1949 |
| 2,839,483 | Howland et al. | June 17, 1958 |
| 2,944,038 | Hunter et al. | July 5, 1960 |